US 9,463,694 B1

United States Patent
Clark et al.

(10) Patent No.: US 9,463,694 B1
(45) Date of Patent: Oct. 11, 2016

(54) VEHICLE INSTRUMENT CLUSTER

(71) Applicant: Ford Global Technologies, LLC, Dearborn, MI (US)

(72) Inventors: Todd N. Clark, Dearborn, MI (US); Kathleen M. Schulz, Novi, MI (US); Christopher Tulik, Belleville, MI (US); Mark Larry, Macomb Township, MI (US)

(73) Assignee: Ford Global Techologies, LLC, Dearborn, MI (US)

( * ) Notice: Subject to any disclaimer, the term of this patent is extended or adjusted under 35 U.S.C. 154(b) by 0 days.

(21) Appl. No.: 14/705,418

(22) Filed: May 6, 2015

(51) Int. Cl.
| | |
|---|---|
| *B60K 37/02* | (2006.01) |
| *B62D 1/04* | (2006.01) |
| *B62D 1/16* | (2006.01) |
| *G02F 1/1333* | (2006.01) |

(52) U.S. Cl.
CPC ............... *B60K 37/02* (2013.01); *B62D 1/04* (2013.01); *B62D 1/16* (2013.01); *G02F 1/133308* (2013.01); *B60K 2350/20* (2013.01); *B60K 2350/40* (2013.01); *B60K 2350/96* (2013.01)

(58) Field of Classification Search
CPC .............. B60K 37/02; B60K 2350/20; B60K 2350/40; B60K 2350/96; B62D 1/04; B62D 1/16; G02F 1/133308
See application file for complete search history.

(56) References Cited

U.S. PATENT DOCUMENTS

| | | | | |
|---|---|---|---|---|
| 1,848,377 A | * | 3/1932 | Novelli | B60K 37/02 180/90 |
| 2,652,652 A | * | 9/1953 | Lasko | B60K 37/02 116/62.4 |
| 4,804,254 A | | 2/1989 | Doll et al. | |
| 5,678,912 A | * | 10/1997 | Ayres | G01D 11/28 362/23.17 |
| 5,813,288 A | * | 9/1998 | Simonetti | B62D 1/16 180/90 |
| 5,819,592 A | * | 10/1998 | Lewandowski | B62D 1/195 280/777 |
| 5,997,161 A | * | 12/1999 | Stringfellow | B60K 37/02 362/23.15 |
| 6,312,773 B1 | * | 11/2001 | Zeiss | B60K 37/02 428/13 |

(Continued)

FOREIGN PATENT DOCUMENTS

| | | |
|---|---|---|
| CN | 202703288 U | 1/2013 |
| DE | 10100214 A1 | 1/2001 |

(Continued)

OTHER PUBLICATIONS

Miura, et al. Fujitsu Sci. Tech., vol. 49, No. 1, pp. 23-28 (Jan. 2013), "Graphics Display Controller for Automotive Applications." (6 pages).

(Continued)

*Primary Examiner* — Laura Freedman
(74) *Attorney, Agent, or Firm* — Frank A. MacKenzie; Brooks Kushman P.C.

(57) ABSTRACT

A configurable vehicle cluster is described which extends down below a top of the steering column to provide a display of information. The display can display information to the driver through or around the steering wheel and the recess in the vehicle cluster through which the steering wheel column extends. An instrument cluster is positioned adjacent the steering assembly and includes a display having an edge that is non-linear and may at least partly wrap around the steering column to increase the viewing area of the cluster. The display may extend around the steering column behind the steering wheel. The vehicle cluster can be mounted lower in a vehicle while providing adequate viewing area and conserving space in the vehicle cabin.

26 Claims, 8 Drawing Sheets

(56) References Cited

U.S. PATENT DOCUMENTS

| | | | | |
|---|---|---|---|---|
| 6,490,776 | B1* | 12/2002 | Gager | B60K 37/02 180/90 |
| 7,024,267 | B2* | 4/2006 | Howton | B60K 37/02 156/345.1 |
| 7,180,020 | B2* | 2/2007 | Onoda | B60K 37/00 200/61.27 |
| 7,264,074 | B2* | 9/2007 | Jennings | B60K 37/02 180/90 |
| 7,370,719 | B2 | 5/2008 | Sakamoto | |
| 7,731,374 | B2 | 6/2010 | Takato | |
| 8,939,493 | B1* | 1/2015 | Barthlow | B60R 13/0256 180/90 |
| 2007/0090939 | A1 | 4/2007 | Takato | |
| 2008/0211652 | A1* | 9/2008 | Cope | B60K 35/00 340/461 |
| 2010/0073584 | A1 | 3/2010 | Harbach et al. | |
| 2016/0191859 | A1* | 6/2016 | Lisseman | H04N 7/183 348/148 |

FOREIGN PATENT DOCUMENTS

| | | | |
|---|---|---|---|
| JP | 2010089728 A | * | 4/2010 |
| KR | 20030083142 A | | 10/2003 |

OTHER PUBLICATIONS

Market Watch, Apr. 21, 2011, HIS iSuppli Aumotive Research Portal—Compents and Devices, "Instrument Clusters: Time for a Change, Availability of hybrid analog/digital instrument clusters to reach nearly 70 percent in vehicles this year." (3 pages).

* cited by examiner

VEHICLE INSTRUMENT CLUSTER

TECHNICAL FIELD

The present disclosure relates to an instrument cluster for a vehicle.

BACKGROUND

FIGS. 1-2 show a conventional vehicle cluster 100 mounted in a vehicle dashboard 101 above the steering column 103. The vehicle cluster 100 has a rectangular shape with a linear bottom edge 105. The bottom edge 105 extends above the steering column 103. A steering wheel 107 is mounted to an end of the steering column 103 and includes brackets 109 extending outwardly from a central pad 108 on the steering column to a steering wheel rim 110. The steering wheel rim 110 extends over part of the vehicle cluster 100. This can result in empty space within the viewable space of the steering wheel 107.

SUMMARY

A vehicle is described that can include a steering assembly with a steering column and a steering wheel rim on the steering column, and an instrument cluster positioned adjacent the steering assembly and including a display having an edge that at least partly wraps around the steering column.

In an example, the instrument cluster includes a liquid crystal display. In an example, the liquid crystal display extends around the steering column behind the steering wheel.

In an example, the steering column includes an elliptical cross section and the edge is at a bottom edge that is arcuate to extend around the elliptical cross section of the steering column.

In an example, the instrument cluster includes a first part on a first side of the steering column and a second part on a second side of the steering column.

In an example, the instrument cluster is adapted to display vehicle information.

In an example, the vehicle information includes infotainment data.

In an example, the vehicle information includes motor operational data.

In an example, the instrument cluster has a viewing area and at least 20% of the viewing area is below an upper most point of the steering column.

The present disclosure further describes a vehicle instrument cluster having a frame and a display supported by the frame. The display has non-linear edge. The display being adapted to display information to a user adjacent the non-linear edge.

In an example, the instrument cluster includes a liquid crystal display.

In an example, the liquid crystal display extends around the steering column behind the steering wheel.

In an example, the liquid crystal display is configured to display information adjacent the non-linear edge.

In an example, wherein the non-linear edge at least partly wraps around the steering column.

In an example, the non-linear edge has a radius that is less than a radius of a steering wheel positioned in front of the display in the vehicle.

In an example, the display is curved about a horizontal axis.

In an example, the horizontal axis of the display is positioned at about a center of the display to essentially bisect the display.

In an example, the horizontal axis of the display is positioned below a center of the display so that a top part of the display is greater in area than a bottom part of the display.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 3:
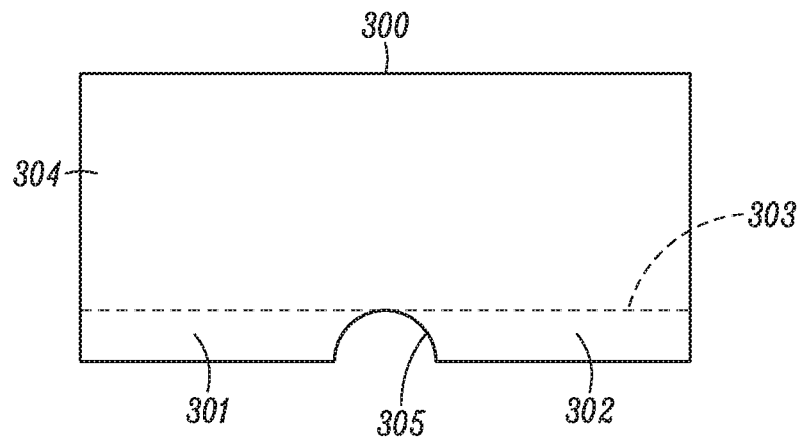
FIG. 3 is view of an instrument cluster according to an embodiment of the present disclosure.
Figure 4:
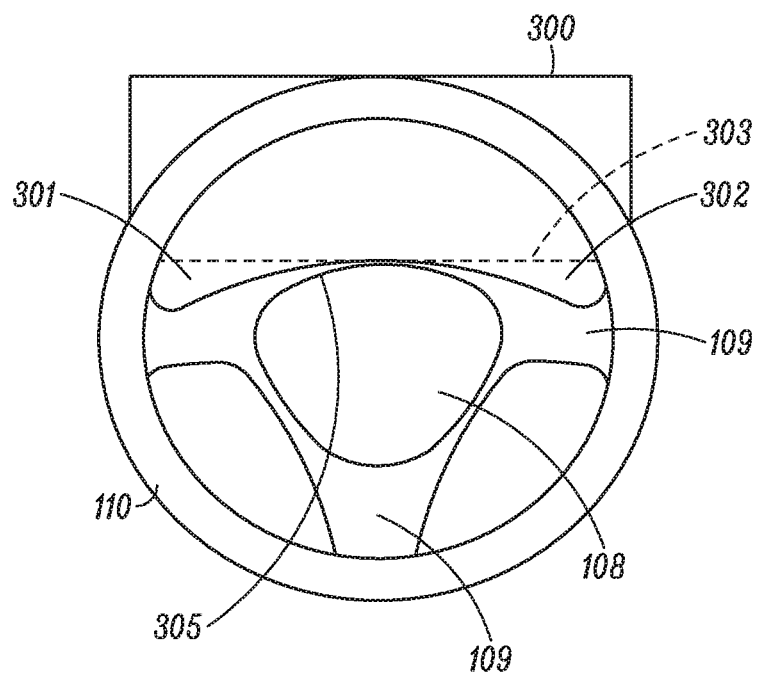
FIG. 4 is view of an instrument cluster and steering assembly according to an embodiment of the present disclosure.

FIGS. 3 and 4 show a vehicle cluster 300 is positioned adjacent a steering column 103 and is configured to display information to the driver. The vehicle cluster 300 can include an electronic display, e.g., a liquid crystal display, a light emitting diode display, an organic light emitting diode display, a plasma display, electroluminescent display, and the like. The display can be formed in the cluster such that the electronic display encompasses almost the entire area of the front surface of the cluster. There may be a small frame around the periphery of the cluster to fix the electronic display in place. In an example, the frame width is one inch or less. The frame width can be one-half inch or less or less than one-quarter inch. The cluster 300 and its display may be integrally formed such that any mount points are formed integral with the display. The cluster 300 has a rectangular part 304 above the top of the steering column 103. The top of the steering column 103 is shown by dotted line 303. The cluster 300 further includes a first display extension part 301 and a second display extension part, which both extends around the steering column 103. The first display extension part 301 extends past (below in FIG. 3) the top of the steering column, i.e., line 303. The second display extension part 302 extends past (below in FIG. 3) the top of the steering column, i.e., line 303. The parts 301, 302 form a non-linear bottom of the vehicle cluster which includes a recess 305 in which at least part of the steering column 103 is received. Accordingly, the display extension parts 301, 302 extend at least part way around the steering column 103. In use, the vehicle cluster 300 has a greater display area than the prior vehicle cluster 100. The top corners of the cluster 300 above the steering wheel may not be used for display of information.

Figure 5:
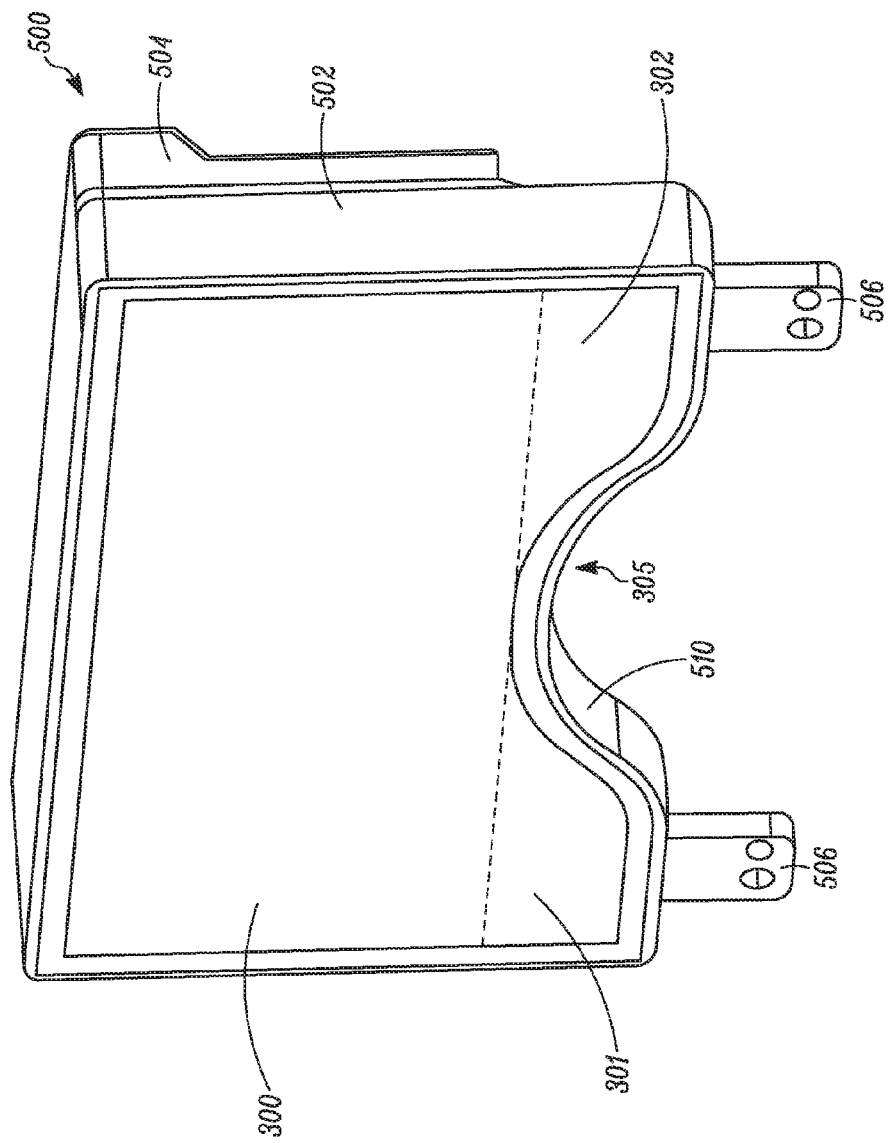
FIG. 5 is view of an instrument cluster according to an embodiment of the present disclosure.

FIG. 5 shows a vehicle cluster component 500 that is configured to mount into an interior of a vehicle, e.g., fixed into a dashboard assembly. Component 500 includes a frame 502 around the sides of the vehicle cluster 300. The frame 502 can be a rigid material, e.g., a metal or polymer. A rear extension 504 extends rearwardly and can be used to align the component 500 in a vehicle dashboard. A plurality of attachment arms 506 extend outwardly and are used to fix the component to the vehicle, e.g., the dashboard. A curved bottom 510 of the frame 502 defines the recess 305.

Figure 6:
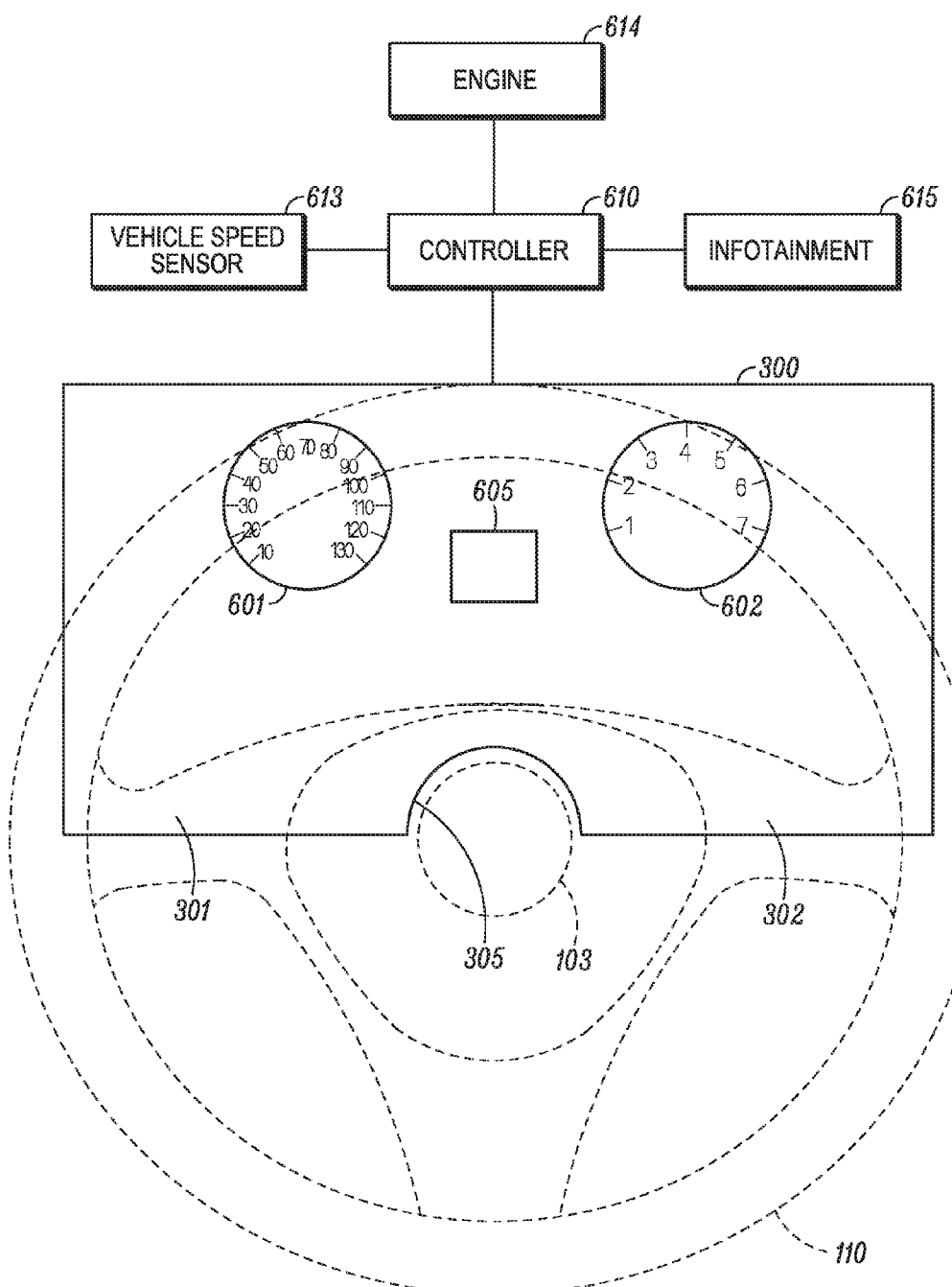
FIG. 6 is view of an instrument cluster and steering wheel according to an embodiment of the present disclosure.

FIG. 6 shows the steering wheel rim 110 and the vehicle cluster 300. Vehicle information is displayed by the vehicle cluster 300 in a first configuration. The displayed vehicle information can include a first information display 601 and a second information display 602. In the illustrated example, the first information display 601 is a speedometer. The second information display 602 is a tachometer. The first information display 601 is in the main part of the vehicle cluster 300 above the recess 305 and not in the display extensions 301, 302. The second information display 602 is also in the main part of the vehicle cluster 300 above the recess 305 and not in the display extensions 301, 302. However, at least part of the first information display 601 is covered by the steering wheel rim 110. At least part of the second information display 602 is covered by the steering wheel rim 110. The vehicle cluster 300 can also show additional vehicle information, e.g., performance, infotainment and the like, at location 605.

The information shown on the vehicle cluster 300 can be provided by a controller 610 operatively connected to the vehicle cluster. The controller 610 can control type of information displayed on the vehicle cluster 300. The controller 610 can include a graphic controller that interprets vehicle data and outputs display instructions to the vehicle cluster 300. The controller 610 can receive data from the vehicle speed sensor 613, the engine 614 and the infotainment system 615. Based on user or driver input through an input/output device, the controller can change the information displayed on the vehicle cluster 300 and the location of information on the vehicle cluster 300.

Figure 7:
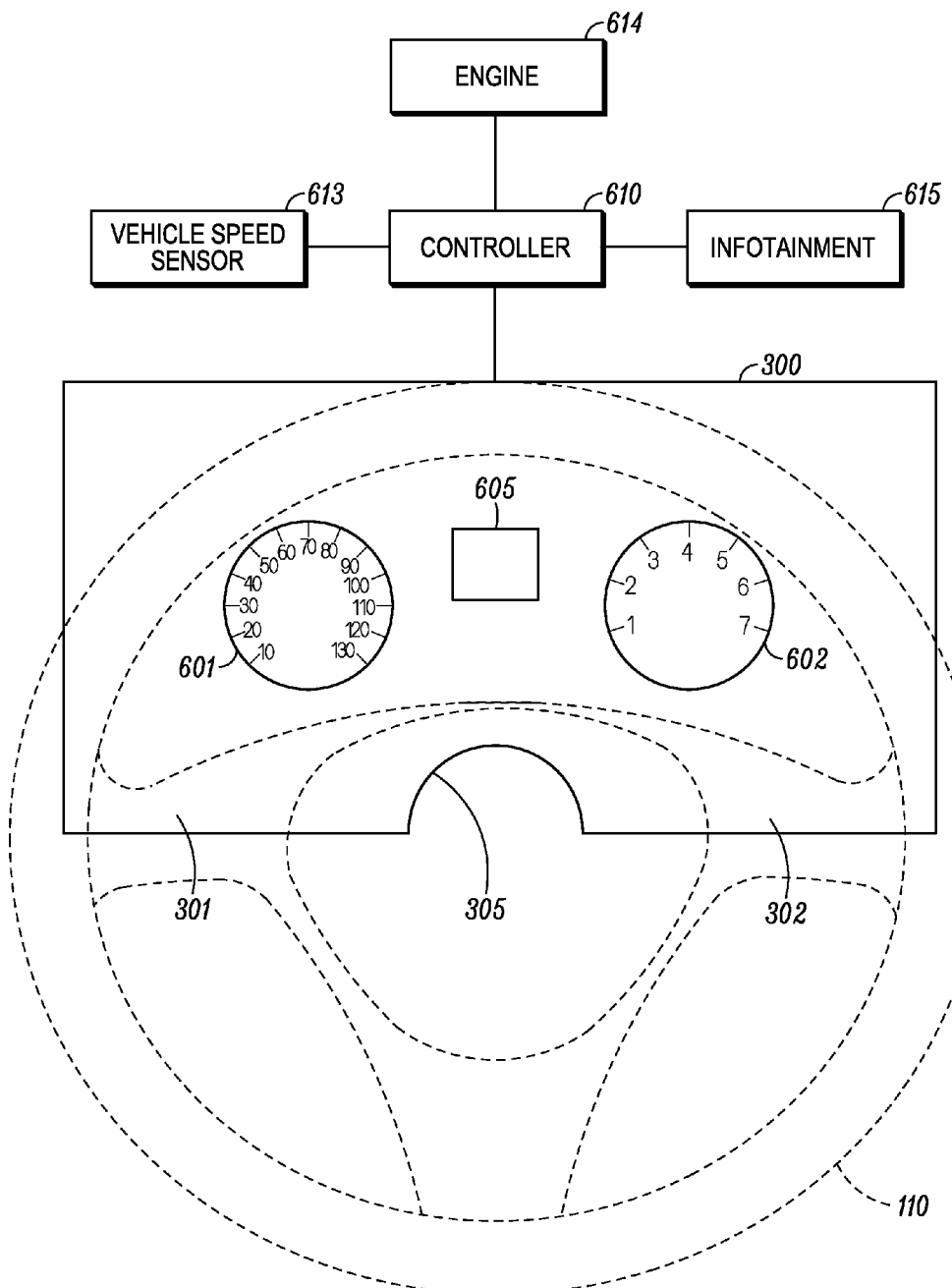
FIG. 7 is view of an instrument cluster and steering wheel according to an embodiment of the present disclosure.

FIG. 7 shows a vehicle cluster 300 that is the same as FIG. 6 but with the information being displayed moved to a different location. Here, the first information display 601 is moved to a different location, specifically, from the main display area of the vehicle cluster to be at least partially positioned in the first display extension 301. That is, the vehicle cluster formed with an electronic display is fully configurable. The first information display 601 is now not positioned with the steering wheel rim blocking the display 601. The second information display 602 is also moved to a different location, specifically, from the main display area of the vehicle cluster to be at least partially positioned in the second display extension 302. The second information display 602 is now not positioned with the steering wheel rim blocking the second display 602. The information 605 is not moved as it is not covered by the steering wheel rim 110 in either the FIG. 6 example or the FIG. 7 example. It will be recognized that information being displayed on the vehicle cluster 300 being blocked by the steering wheel rim 110 depends in part on the height of the drive, the posture of the driver, the seat location and the position of the steering wheel. In many vehicles a steering wheel can be moved. The vehicle cluster 300 can include a plurality of different configurations in which information can be moved about the cluster. The controller can move the information displays 601, 602 on a pixel-by-pixel basis to individualize the vehicle cluster for a specific user. In an example, the vehicle can include a memory that stores the user display preferences, e.g., along with the seat position and steering wheel position, and that display preference is used to display the information. With such a structure, the vehicle cluster 300 is fully configurable and the information being displayed can be moved to any location on the electronic display of the vehicle cluster 300.

Figure 8:
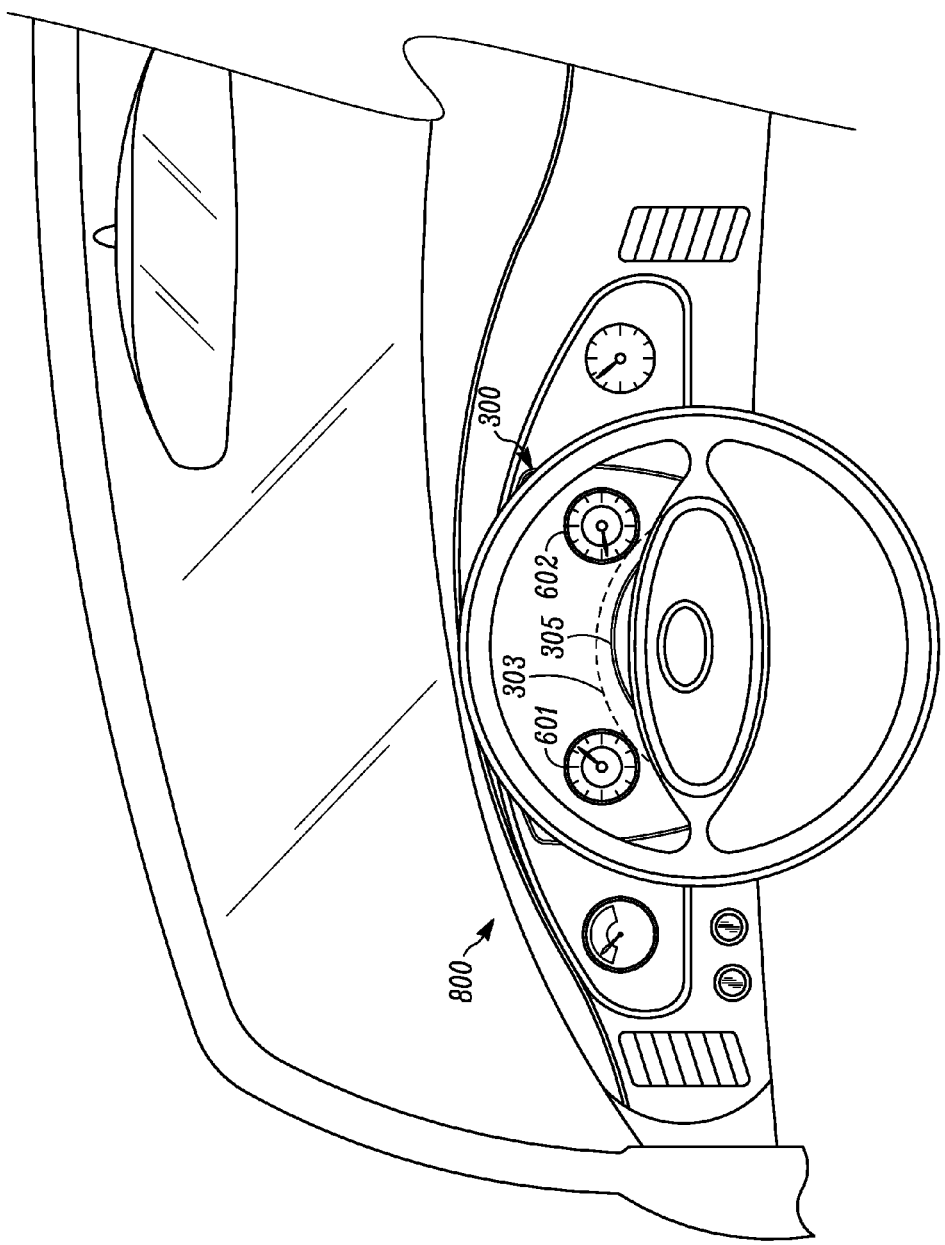
FIG. 8 is a view of a vehicle interior according to an embodiment of the present disclosure.

FIG. 8 shows an interior of a vehicle 800 with an instrument clusters 801 that may include a display area capable of being switched to show one of many of available information screens. In an example, the instrument cluster 801 may include a menu structure having a set of categories, such as trip/fuel information, truck information, towing information, and off-road information. The menu structure may further include information screens placed at predefined locations within the defined categories. The predefined locations can be changed using any of the display including a portion of the display below the top of the steering column.

When the user wishes to display information on one of these screens, the user may first select the category in which the screen is placed, and then select the screen from the selected category. However, as capabilities and information screens are added to the instrument cluster, it may become progressively more difficult for users to navigate the display area to the desired category and information screen. Additionally, it may be difficult for users to remember where in the menu structure a specific element of information is located. Nevertheless, despite the quantity of available information, many users only wish to switch among a small subset or sequence of the available information screens. The user may also desire to change the location of the information in the selected screen to be in the additional display area at the bottom of the display.

The instrument cluster may allow a user to configure a portion of a menu structure with a bookmarked sequence of favorite information screens and the location of the information on the display. In many examples, the configuration of the bookmarked sequence may be performed when the vehicle is parked. Then, when the user is driving, the user may be able to quickly cycle through the sequence of favorite bookmarked screens for quick selection of information screen to be displayed in the vehicle's gauge cluster. Moreover, these sequences may be displayed in the extended portions, e.g., 301 and 320, of the vehicle cluster.

Figure 9:
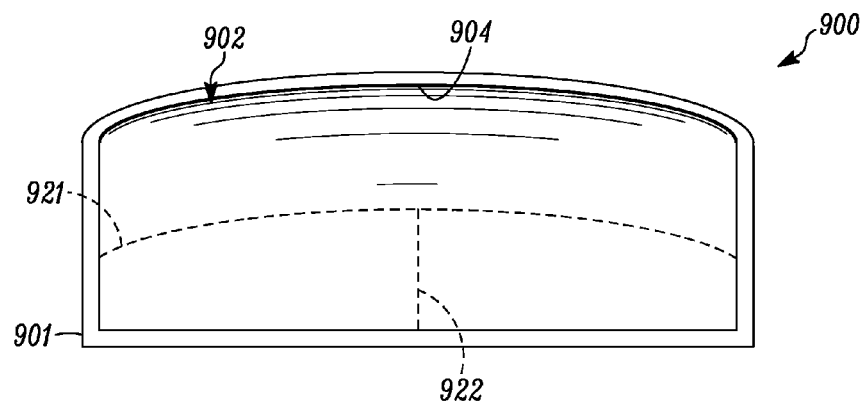
FIG. 9 is view of an instrument cluster according to an embodiment of the present disclosure.

FIG. 9 shows a view of an instrument cluster 900 for mounting within a vehicle. The instrument cluster 900 includes a frame 901 and a display 902 being mounted in the frame 901. The frame 901 can include a support structure to be fixed to the vehicle, e.g., the cabin, and optionally a lens mounted in front of display. Support structure connectors are positioned behind the view of FIG. 9. The display 902 includes a non-linear edge 904 around which information can be displayed based on signals from a controller and through driver circuitry. While illustrated as the non-linear edge of the display 902 is shown as the top edge, it is within the scope of the present disclosure to have non-linear edges along the sides or bottom of display 902. With the top edge being curved, it can be curved such that it has a radius of curvature greater than the radius of the steering wheel to maximize the viewable area with the steering wheel so that a driver can see display within the gaps in the steering wheel and some display above the steering wheel.

The display 902 can be a flat panel display. However, the display 902 can be non-flat. The display 902 can be a curved. In an example, the display 902 can be concave facing the interior of the cabin and the driver. The display 902 can be curved about the horizontal axis 921. The horizontal axis 921 can be at along the center of display to essentially bisect the display in half. However, the horizontal axis 921 may be positioned below the center such that the display part above the axis 921 is greater than the display part below the axis. The display 902 can be curved about the center vertical axis 922. In another example, the top half of the display 902 above the center horizontal axis 921 is curved with the bottom half below the axis 921 being flat or curved at a different radius than the top half.

Figure 10:
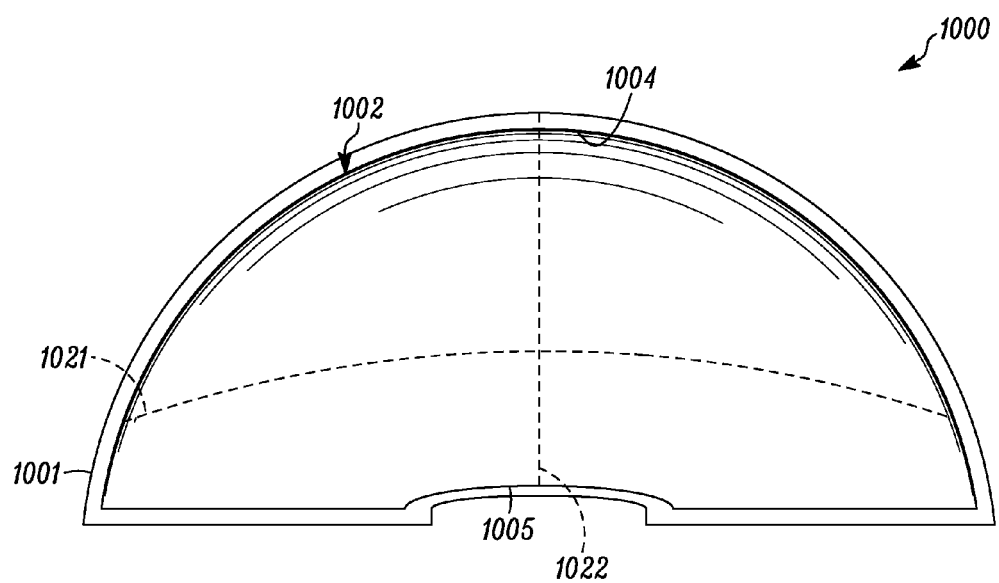
FIG. 10 is view of an instrument cluster according to an embodiment of the present disclosure.

FIG. 10 shows a view of an instrument cluster 1000 for mounting within a vehicle. The instrument cluster 1000 includes a frame 1001 and a display 1002 being mounted in the frame 1001. The frame 1001 can include a support structure to be fixed to the vehicle, e.g., the cabin, and optionally a lens mounted in front of display.

The display 1002 can be a flat panel display. However, the display 1002 can be non-flat. The display 1002 can be a curved. In an example, the display 1002 can be concave facing the interior of the cabin and the driver. The display 1002 can be curved about the horizontal axis 1021. The horizontal axis 1021 can be at along the center of display to essentially bisect the display in half. However, the horizontal axis 1021 may be positioned below the center such that the display part above the axis 1021 is greater than the display part below the axis 1021. The display 1002 can be curved about the center vertical axis 1022. In another example, the top half of the display 1002 above the center horizontal axis 1021 is curved with the bottom half below the axis 1021 being flat or curved at a different radius than the top half.

The FIGS. 9 and 10 embodiments show the display 902, 1002 to take almost the entire area of the vehicle cluster. This maximizes the electronic display area that can be electronically controlled to arrange the information on the display.

Figure 11:
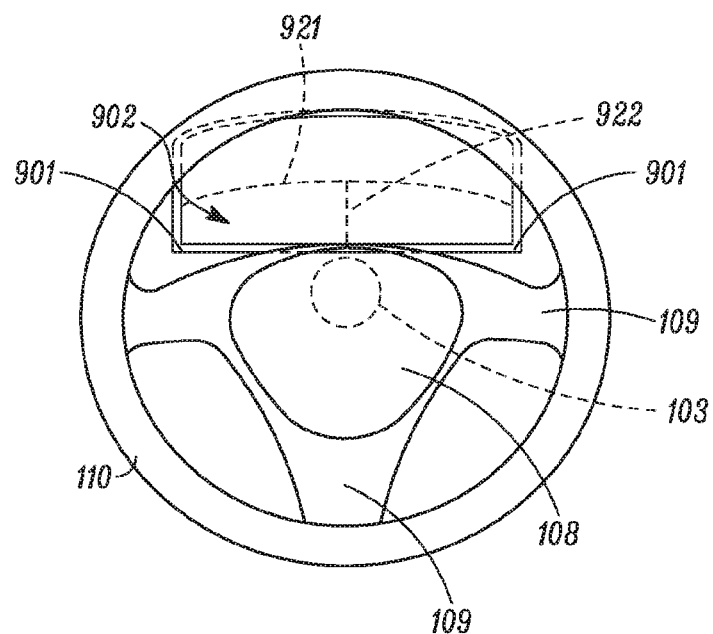
FIG. 11 is view of an instrument cluster and steering wheel according to an embodiment of the present disclosure.

FIG. 11 shows the instrument cluster 900 behind the steering wheel rim 110 and brackets 109 connecting the steering wheel rim 110 to the steering column 103. The display 902 is positioned above the steering column 103. The top edge of the display 902 is curved to match the curvature of the steering wheel rim 110.

Figure 12:
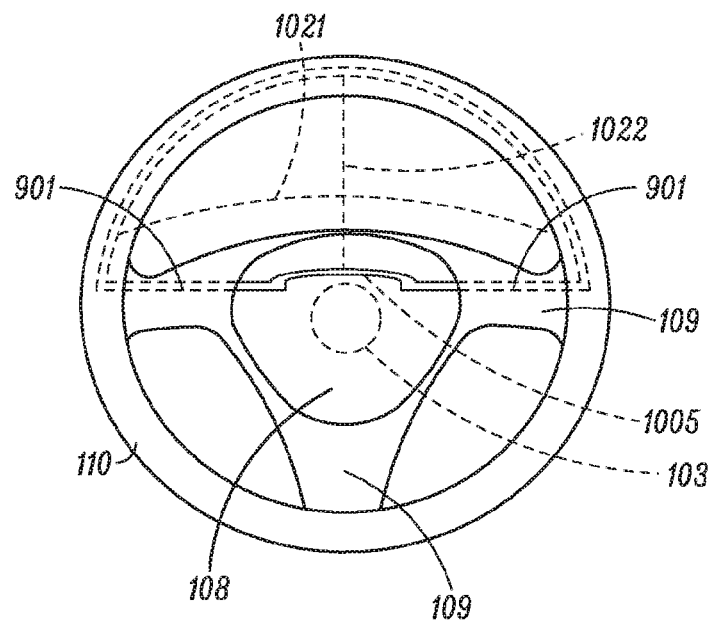
FIG. 12 is view of an instrument cluster and steering wheel according to an embodiment of the present disclosure.

FIG. 12 shows the instrument cluster 1000 behind the steering wheel rim 110 and brackets 109 connecting the steering wheel rim 110 to the steering column 103. The display 1002 is positioned with a top part above the steering column 103 and a lower part that extends below the top of the steering column 103. The lower part of the display 1002 can include extensions 301, 302 that extend around left and right sides of the steering column 103. The top edge (1004 in FIG. 10) of the display 1002 is curved to match the curvature of the steering wheel 110. In both FIGS. 11 and 12 embodiments, the top edge of the display 902, 1002 is curved to match the curve of the top of the steering wheel rim 110. Thus the electronic display 902, 1002 fills the entire open area with in the steering wheel to maximize the viewing area. The information shown on the display 902 or 1002 can be moved to any location on the display, similar to the movement shown in FIGS. 6 and 7. The bottom edge 1005 of the display can be shaped to receive at least part of a steering wheel column thereat.

The vehicle clusters 900, 1000 may be desirable for use in smaller vehicles (compact, sub-compact automobiles) such that the electronic display formed with the cluster maximizes the display area for the vehicle.

A vehicle can include a configurable display, e.g., display 300, to facilitate communication of information with a driver. The vehicle, e.g., vehicle 800, may include various types of passenger vehicle, such as crossover utility vehicle (CUV), sport utility vehicle (SUV), truck, recreational vehicle (RV), boat, plane, tractor or other mobile machine for transporting people or goods. It should be noted that the illustrated vehicle 800 shown in FIG. 8 is merely an example, and more, fewer, and/or differently located elements may be used.

An information display system 104 of the vehicle 102 may include one or more processors and/or circuitry configured to perform instructions, commands and other routines in support of the processes described herein. Such processors can include the controller 610. For instance, the information display system may be configured to execute instructions of a display application loaded to a memory to provide information display features such as trip counters, fuel economy, fuel history, digital speedometer, engine information, and towing status. These examples of vehicle information can be displayed on the display extensions 301, 302. Such instructions and other data may be maintained in a non-volatile manner using a variety of types of computer-readable storage medium. The computer-readable medium (also referred to as a processor-readable medium or storage) includes any non-transitory medium (e.g., a tangible medium) that participates in providing instructions or other data that may be read by the processor of the information display system. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The information display system can further include driver circuitry that can be mounted with the display to control individual components of the display, for example, individual diodes or individual crystals. In the case of the display with the non-linear edge or recess, the driver circuitry does not address a rectangular grid (constant number of rows, constant number of columns) as the display is non-rectangular. The driver circuitry can received its instruction signals from the controller 610.

The information display system may be provided with various features allowing the vehicle occupants to interface with the information display system. For example, the information display system may include an input controller configured to receive user input from one or more human-machine interface (HMI) controls of the vehicle 800 providing for occupant-vehicle interaction. These may include one or more buttons, knobs, or other controls configured to invoke functions on the information display system. The information display system may also drive or otherwise communicate with one or more configurable displays configured to provide visual output to vehicle occupants by way of a display controller, e.g., controller 701. The display 300 can be configured by the user input into the display system to show information on the display laterally adjacent the steering column and not limited to above the steering column.

The presently described displays, e.g., 300, 902 or 1002, can be continuous display that has individually addressable display components that provide pixels that can be changed in appearance, e.g., color, to show an image on the display. Such a continuous display can allow the images shown thereon to be moved by merely readdressing the output from the controller to driver circuitry of the display. This will shift the location of the displayed information.

Electronic display screens, e.g., a Liquid Crystal Display (LCD), can be used across a range of applications, including vehicles. A vehicle may have a plurality of viewing screens. The electronic display screen not only offer functions such as brightness, wide viewing angle, high resolution and color purity; but also greater performance and user interface features relative to traditional mechanical gauges. Electronic versions of the gauges can be displayed on screen in multiple configurations. Electronic displays allow the information to be moved to any available location on the display unlike mechanical gauges that are fixed in a single location. The electronic displays can be a continuous display that allows displayed information to be enlarged, shrunk, or moved. The display can also allow the shown data to be swapped, e.g., the speedometer can swap positioned with the tachometer, as desired by a user. This allows the vehicle to be configured to the user and not require the user to adapt to the vehicle.

Figure 1:
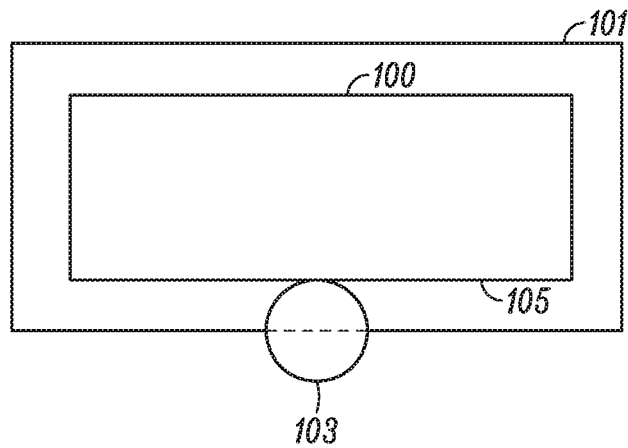
FIG. 1 is view of an instrument cluster according to the prior art.
Figure 2:
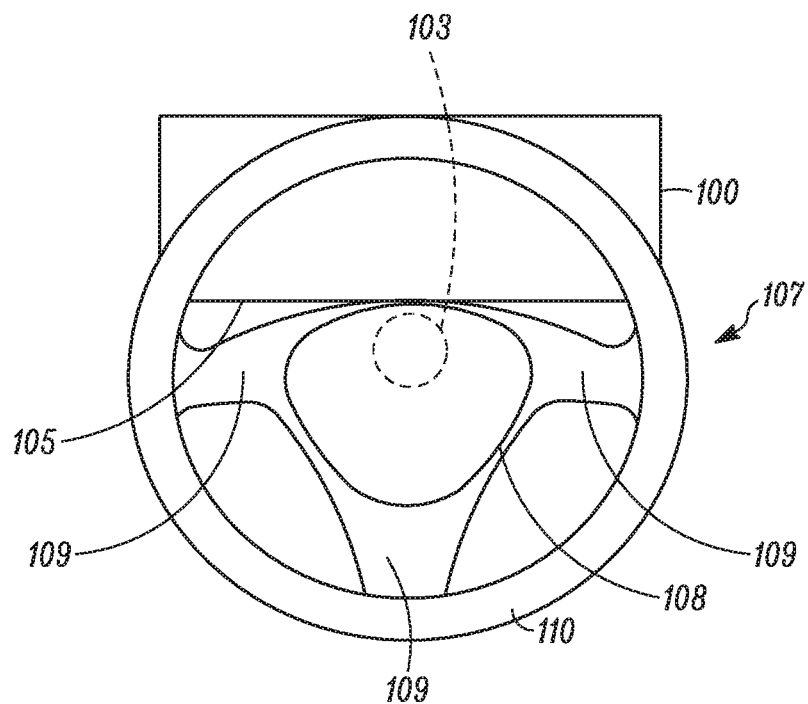
FIG. 2 is view of an instrument cluster and steering assembly according to the prior art.

Conventional displays are rectangular and force the design of the instrument cluster to follow that rectangular shape, see e.g., FIG. 1. Such a display restricts the instrument cluster at the bottom thereof by the steering column and at the top thereof by the steering wheel rim. This limits the ability of the cluster to optimize the viewing surface for the driver. The presently described vehicle clusters, which can be an electronic display, provide a larger display in an instrument cluster as the display includes parts that extend below the top of steering column. That is, the display at least partially wraps around the steering column. In order to optimize the viewable surface area of the instrument cluster display, an electronic display follows the shape of the steering column allowing the instrument cluster to be packaged lower in the vehicle. This can significantly improve the viewable surface of the display. The viewable area of the presently described display embodiments can increase the viewable area by greater than 10%, greater than 20%, greater than 25%, approximately 29%, or greater than 30%. Moreover, the information displayed can be rearranged on the display so that the information is viewable by the driver and not behind the steering wheel.

The present vehicle clusters can also be mounted to more closely match the steering assembly which may improve the viewing area for a driver. In some embodiments, the vehicle cluster (e.g., 300, 500, or 1000) can be mounted lower in the dashboard or vehicle interior. In some embodiments, the vehicle cluster (e.g., 900 or 1000) can have edges that generally conform to the steering wheel to improve the viewing are of the cluster. The forming of the display in the vehicle cluster to be a non-rectangular shape can provide an improvement in viewing of the information on the vehicle cluster display.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
   a steering assembly comprising a steering column and a steering wheel on the steering column; and
   an instrument cluster positioned adjacent the steering assembly and including a liquid crystal display having an edge that at least partly wraps around the steering column.

2. The vehicle of claim 1, wherein the liquid crystal display extends around the steering column behind the steering wheel.

3. The vehicle of claim 1, wherein the steering column includes an elliptical cross section and the edge is at a bottom edge that is arcuate to extend around the elliptical cross section of the steering column.

4. The vehicle of claim 1, wherein the instrument cluster includes a first part on a first side of the steering column and a second part on a second side of the steering column.

5. The vehicle of claim 1, wherein the instrument cluster is adapted to display vehicle information.

6. The vehicle of claim 5, wherein the vehicle information includes infotainment data.

7. The vehicle of claim 5, wherein the vehicle information includes motor operational data.

8. The vehicle of claim 1, wherein the instrument cluster has a viewing area and at least 20% of the viewing area is below an uppermost point of the steering column.

9. A vehicle instrument cluster comprising:
   a frame; and
   a liquid crystal display supported by the frame and with a non-linear edge, the liquid crystal display being adapted to display information to a user adjacent the non-linear edge, wherein the non-linear edge at least partly wraps around a steering column.

10. The cluster of claim 9, wherein the non-linear edge has a radius that is less than a radius of a steering wheel positioned in front of the liquid crystal display in the vehicle.

11. The cluster of claim 9, wherein the liquid crystal display is curved about a horizontal axis.

12. The cluster of claim 11, wherein the horizontal axis is positioned at about a center of the liquid crystal display to essentially bisect the display.

13. The cluster of claim 11, wherein the horizontal axis is positioned below a center of the liquid crystal display so that a top part of the liquid crystal display is greater in area than a bottom part of the liquid crystal display.

14. A vehicle instrument cluster comprising:
   a frame; and
   a liquid crystal display supported by the frame and with a non-linear edge, the liquid crystal display being adapted to display information to a user adjacent the non-linear edge, wherein the liquid crystal display extends around a steering column behind a steering wheel.

15. The cluster of claim 14, wherein the non-linear edge has a radius that is less than a radius of a steering wheel positioned in front of the liquid crystal display in the vehicle.

16. The cluster of claim 15, wherein the instrument cluster has a viewing area and at least 20% of the viewing area is below an uppermost point of the steering column.

17. The cluster of claim 14, wherein the liquid crystal display is curved about a horizontal axis.

18. The cluster of claim 17, wherein the horizontal axis is positioned at about a center of the liquid crystal display to essentially bisect the display.

19. The cluster of claim 17, wherein the horizontal axis is positioned below a center of the liquid crystal display so that a top part of the liquid crystal display is greater in area than a bottom part of the liquid crystal display.

20. A vehicle comprising:
   a steering assembly comprising a steering column and a steering wheel on the steering column; and
   a display positioned adjacent the steering assembly and including an edge that at least partly wraps around the steering column, wherein the display is a liquid crystal display.

21. The vehicle of claim 20, wherein the liquid crystal display extends around the steering column behind the steering wheel.

22. The vehicle of claim 20, wherein the steering column includes an elliptical cross section and the edge is at a bottom edge that is arcuate to extend around the elliptical cross section of the steering column.

23. The vehicle of claim 20, wherein the display has a viewing area and at least 20% of the viewing area is below an upper most point of the steering column.

24. A vehicle comprising:
   a steering assembly comprising a steering column and a steering wheel on the steering column; and
   a liquid crystal display positioned adjacent the steering assembly and including an edge that at least partly wraps around the steering column, wherein the liquid crystal display extends around the steering column behind the steering wheel.

25. The vehicle of claim 24, wherein the steering column includes an elliptical cross section and the edge is at a bottom edge that is arcuate to extend around the elliptical cross section of the steering column.

26. The vehicle of claim 24, wherein the display has a viewing area and at least 20% of the viewing area is below an uppermost point of the steering column.

* * * * *